July 20, 1965 R. M. WALKER ETAL 3,196,339

MICROWAVE HARMONIC GENERATOR AND FILTER ELEMENT THEREFOR

Filed June 23, 1960 2 Sheets-Sheet 1

INVENTORS
RICHARD M. WALKER
ARTHUR A. BLAISDELL
BY
Alfred H. Rosen
ATTORNEY

MICROWAVE HARMONIC GENERATOR AND FILTER ELEMENT THEREFOR

Filed June 23, 1960 2 Sheets-Sheet 2

INVENTORS
RICHARD M. WALKER
ARTHUR A. BLAISDELL
BY Alfred H. Rosen
ATTORNEY 3,196,339

MICROWAVE HARMONIC GENERATOR AND FILTER ELEMENT THEREFOR

Richard M. Walker, Roxbury, and Arthur A. Blaisdell, Natick, Mass., assignors to Microwave Associates, Inc., Burlington, Mass., a corporation of Massachusetts Filed June 23, 1960, Ser. No. 38,231
19 Claims. (Cl. 321—69)

This invention relates in general to the field of microwave harmonic generators and filter elements for segregating a fundamental frequency and harmonics thereof.

The harmonic generator is familiar as a means of generating power at frequencies for which other power sources may not be readily available or convenient to use. Nonlinear circuit elements (resistors or capacitors) are used to generate harmonics, in practical circuits which usually employ tuning to maximize the output of the desired harmonic and filters to prevent power dissipation at unwanted frequencies. Recently the nonlinear capacitor in the form of a graded junction silicon semiconductor diode (i.e., "Varactor") has been used with success in such a circuit to generate harmonics at frequencies in excess of 40 kmc./sec., as well as subharmonics. This is reported by D. Leenov and A. Uhlir, Jr., in Semiconductor Products, October 1959, pages 25 to 28, inclusive. Figure 2 on page 28 of this article shows a harmonic generator circuit, in schematic form, using a nonlinear capacitance diode, which may be taken as representative of the prior art in this field.

In general, such harmonic generators are adapted to pass a fundamental frequency (*fo*) through a low- or band-pass filter, which cuts off between *fo* and its first harmonic, and thence through the nonlinear element, in which harmonics are generated; a band-pass filter centered at *nfo*, where "*n*" is an integer, or a suitable high-pass filter follows the nonlinear element, and is in turn followed by the harmonic output. The first (low- or band-) pass filter prevents *nfo* from passing back to the source of *fo*, and the second (high- or band-) pass filter prevents *fo* from passing to the harmonic output, and hence to the load. As Fig. 2 of the Leenov and Uhlir article referenced above indicates, a number of adjustable line and stub elements are required to maximize the output of the desired harmonic; these function to match out energy of the rejected frequency reflected from each filter.

The use of such tuning elements introduces difficulties in design and limitations on the use of harmonic generators, particularly in the microwave frequency ranges, such as X-band and K-band. For example, the tuning elements are inherently frequency sensitive, and the use of a number of them restricts the bandwidth over which a given harmonic generator can be employed. Each extra tuning element which is incorporated in a harmonic generator is seen at both frequencies involved (*fo* and *nfo*), and this makes it difficult efficiently to generate harmonics above the fourth harmonic at UHF, or above the second harmonic at X-band and above. Further, the interrelation of all the elements of any given circuit configuration makes it difficult to "tune up" a configuration which uses a large number of individually adjustable tuning elements, and this is particularly true at the higher microwave and millimeter wave frequencies.

It is an object of the present invention to provide a harmonic generator of wide-band capability with improved efficiency. It is another object of the invention to provide a harmonic generator of a design which basically does not require the use of separate tuning elements.

According to the present invention, a harmonic generator is provided with a low-pass (or a suitable band-pass) filter at the input (*fo*) side of the nonlinear element, which is effectively a mismatch to the desired harmonic frequency (*nfo*), and a high-pass or suitable band-pass filter, at the output (*nfo*) side of the nonlinear element, which is effectively a mismatch to the fundamental frequency (*fo*), and the filters are each spaced from the nonlinear element an electrical distance such that the high-pass filter sees a tuned harmonic generator at the desired harmonic frequency (*nfo*) and the low-pass filter sees a matched termination at the fundamental frequency (*fo*). Thus, for example, the electrical distance from the effective mismatch of the low-pass filter at *nfo* to the nonlinear element may be $\lambda/4$ (*nfo*), and the electrical distance from the effective mismatch of the high-pass filter at *fo* to the nonlinear element may be $\lambda/4$ (*fo*). Each filter is used for two distinct and separate purposes, and therefore has simultaneously two separate and distinct functions—namely, its function as a filter for *fo* or *nfo*, and other function as a tuning element for the other frequency, *nfo* or *fo*, respectively.

According to another feature of the invention, a band-pass filter is provided which is particularly suitable for passing a given frequency and reflecting harmonics and/or subharmonics thereof, and for precise location relative to the nonlinear element to facilitate adjustment of the electrical distance between these two components. It is another object of the invention to provide an improved microwave filter having these properties. Such a filter is realized, for example, in a flat metallic sheet adapted to fit transversely within a waveguide, and having a recess along an intermediate portion of at least one long edge, the recess being provided with notches extending toward the longer median line, and the notches being of such width that only a selected band of frequencies will pass through the filter. The design of this filter is such that its effective attenuation remains high, and does not fall off, at the so-called "higher" harmonics.

Other and further objects and features of the invention will become apparent from the following description of certain embodiments thereof. This description refers to the accompanying drawings, wherein.

Figure 1:
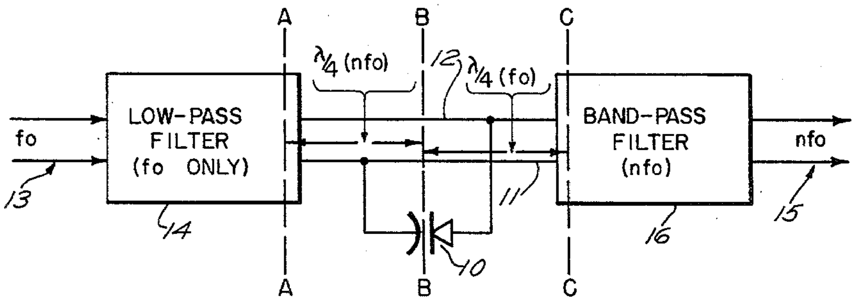
FIG. 1 illustrates schematically the general nature of the invention.

Referring to FIG. 1, a nonlinear element, here shown as a voltage-variable-capacitance diode 10 (sometimes known as a "Varactor") is coupled across a section of transmission line, represented by two lines 11, 12, intermediate the ends of the line. The input end 13 of the line is adapted for input of a fundamental frequency, *fo*, and a low-pass input filter 14 (which might also be a suitable band-pass filter) is coupled across the transmission line between the input end thereof and the nonlinear element 10. The output end 15 of the line is adapted to propagate a harmonic frequency, *nfo*, of the fundamental frequency, and a band-pass output filter 16 (which might also be a suitable high-pass filter) adapted to pass *nfo* is coupled across the transmission line between the output end thereof and the nonlinear element 10. The nonlinear element may be considered to be coupled across the transmission line at a point (or in a plane) represented by a dashed line B—B. The input filter 14 will reflect energy at the harmonic frequency, *nfo*, and as a reflector, it may be considered to be coupled across the transmission line 11, 12 at a point (or in a plane) represented by a dashed line A—A. The electrical distance in the transmission line 11, 12 between the points or planes represented by the dashed lines A—A or B—B is one (or any odd number of) quarter waves of the harmonic frequency, *nfo*. The output filter 16 will reflect energy at the fundamental frequency, *fo*, and, as a reflector, it may be considered to be coupled across the transmission line 11, 12 at a point (or in a plane) represented by a dashed line C—C. The electrical distance in the transmission line between the points or planes represented by the dashed lines B—B and C—C is one (or any odd number of) quarter waves of the fundamental frequency, *fo*.

The input filter 14 presents a capacitive reactance to the harmonic frequency, *nfo*, and is spaced to resonate with the nonlinear element 10 as a harmonic generator, with the result that the output filter 16 sees a tuned generator at the harmonic frequency, *nfo*. The output filter 16 is spaced from the nonlinear element 10 a distance such that the nonlinear element looks like a matched termination to the fundamental frequency, *fo*. There is no requirement for use of separate tuning elements to achieve these results.

Figure 2:
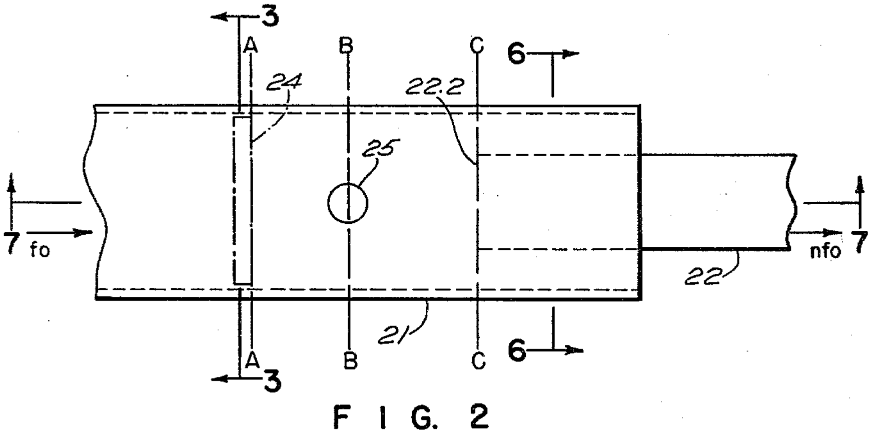
FIG. 2 is a top plan view, partly schematic of an embodiment of the invention.

FIG. 2 illustrates a harmonic generator according to the invention which is realized in a waveguide configuration suitable for generating a harmonic frequency in the K-band region from a fundamental frequency at X-band. A section of X-band rectangular waveguide 21 and a section of K-band rectangular waveguide 22 are telescopically interfitted at an end of each, and joined at confronting bottom wide walls 21.1 and 22.1 respectively, as is shown more clearly in FIG. 6. The dimensions of the K-band waveguide 22 are such that it is beyond cut-off for X-band frequencies (i.e., frequencies below approximately 12 kilomegacycles per second), so that the K-band waveguide is effectively a band-pass filter which cuts off somewhere between X-band and K-band. The end 22.2 of the K-band waveguide 22 inside the X-band waveguide 21 defines the plane represented by the dashed line C—C in FIG. 1, at which the band-pass filter is effectively a short circuit for the fundamental (i.e., X-band) frequency. Electromagnetic wave energy at a fundamental frequency, *fo*, here at X-band, is introduced at the left-hand end of FIG. 2, and energy at a harmonic frequency thereof, *nfo*, here as K-band, is taken out via the K-band waveguide 22 at the right-hand end of FIG. 2. Obviously, suitable waveguide couplers, not shown in FIG. 2, will be used in practice.

Figure 3:
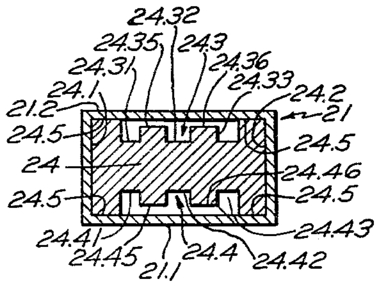
FIG. 3 is a section on line 3—3 of FIG. 2 showing in vertical section a filter element according to the invention.

An input filter element 24, illustrated as a dot-dashed rectangle in FIG. 2 and shown in vertical section in FIG. 3, is fitted transversely in the X-band waveguide 21. As will be explained below, this filter element is effectively a reflector at K-band. It is located in the X-band waveguide so that it effectively reflects K-band energy in the plane represented by the line A—A in FIG. 1.

The location of a nonlinear element (not shown, but corresponding to the nonlinear element 10 in FIG. 1), relative to the X-band waveguide 21, is represented by a circle 25 shown disposed at the intersection of the dashed line B—B and the common center line 7—7 of the two waveguides 21 and 22. Representative nonlinear elements and supporting structure therefor are described below in connection with FIGS. 7 and 8. The location of the nonlinear element is not confined to the center line 7—7; it can be shifted to either side of the center line, along the dashed line B—B. In any case, a nonlinear element is coupled across the X-band waveguide in a location which, electrically, is effectively in the plane represented by the dashed line B—B.

The input filter element 24 shown in FIG. 3 is made of a flat sheet of metal, for example brass, preferably silver plated, of generally rectangular shape and having the same length and width dimensions as the interior wide and narrow wall dimensions, respectively, of the X-band waveguide 21. At the narrow ends 24.1 and 24.2, the input filter element is in contact electrically, along its smaller sides, with the narrow walls of the waveguide. The longer sides of this filter element are recessed in their median regions 24.3 and 24.4, leaving only the end portions 24.5 of each longer side in contact with respective confronting portions of the wide walls of the X-band waveguide 21. A series of three slots or notches is cut in each median region, in the direction parallel to the edges of the narrow ends 24.1 and 24.2, as follows: slots 24.31, 24.32 and 24.33 in the first median region 24.3, and slots 24.41, 24.42 and 24.43 in the second median region 24.4. This leaves two projections 24.35 and 24.36 in the first median region 24.3, which extend from the median portion of the low-pass filter element toward but do not touch the confronting top wide wall 21.2 of the X-band waveguide 21, and two projections 24.45 and 24.46 in the second median region 24.4, which extend in the opposite direction toward but do not touch the confronting bottom wide wall 21.1 of the X-band waveguide. The widths of the slots, in the direction of the long dimension of the filter element 24, are each small compared to the wavelength of the highest harmonic frequency sought to be reflected, as will be more fully explained below. As such, the slot widths are extemely small compared to the wavelength of the fundamental frequency, *fo*.

Figures 5, 6, 7, 8:
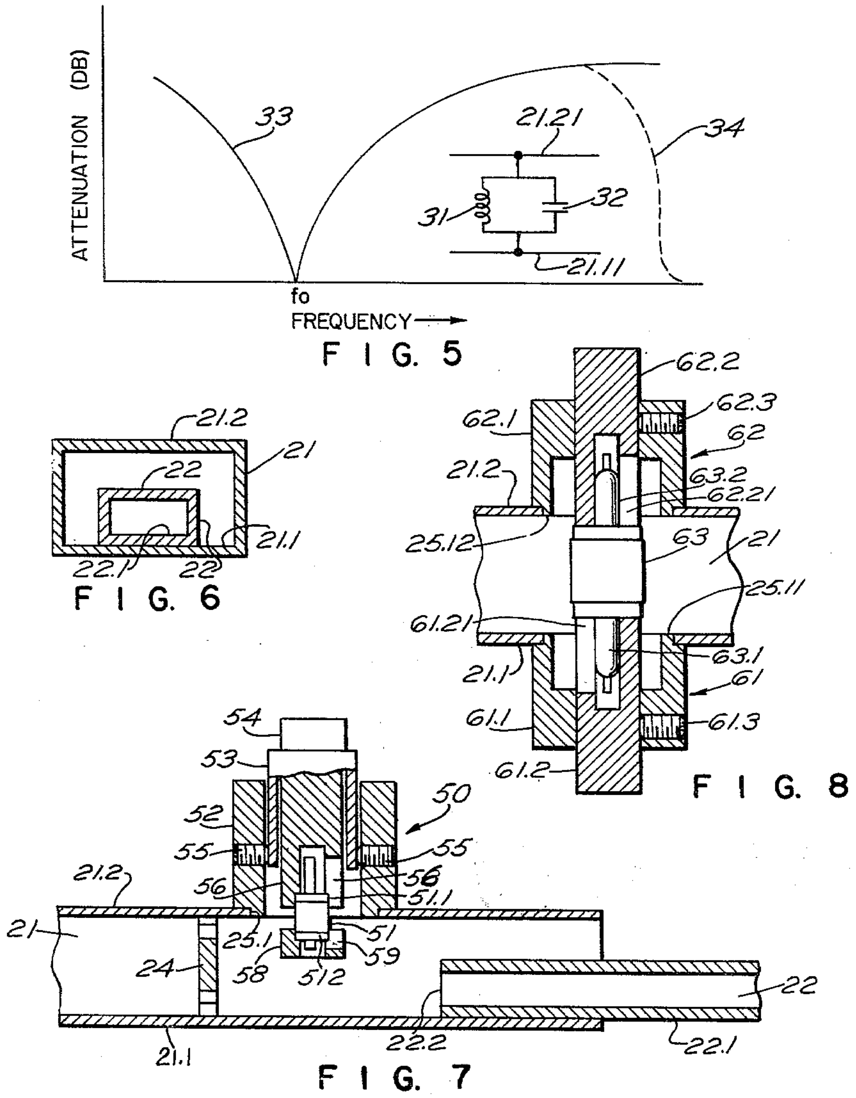
FIG. 5 is a graph illustrating the properties of filter elements according to the invention.
FIG. 6 is a cross section taken along line 6—6 of FIG. 2.
FIG. 7 is a longitudinal section of a harmonic generator like FIG. 2, taken along line 7—7 in that figure.
FIG. 8 is a partial longitudinal section, in the same plane as FIG. 7, of another embodiment of the invention.

The operation of the filter element 24 is explained with the aid of FIG. 5. The end portions of the filter element bounded by the periphery of each narrow end 24.1 and 24.2 and the portions 24.5 of the longer sides adjacent thereto constitute, electrically, inductive iris elements in the X-band waveguide 21. The median portion of the filter element between the recessed median regions 24.3 and 24.4 of the longer sides constitute a capacitive iris element across the same waveguide. The inductance and capacitance of these iris elements are in parallel across the waveguide 21, as represented schematically in FIG. 5 by an equivalent circuit consisting of an inductor 31 and a capacitor 32 connected in parallel across a pair of lines 21.11 and 21.21, which are representative of the wide walls 21.1 and 21.2, respectively, of the X-band waveguide. The magnitudes of these two elements are chosen to provide parallel resonance at the fundamental frequency, *fo*. The curve 33 in FIG. 5 illustrates the ideal attenuation, in decibels, of the filter element 24 with respect to the frequency of energy propagated in the X-band waveguide. At the fundamental frequency, *fo*, the idealized attenuation is zero, corresponding to theoretical infinite impedance of the parallel resonance equivalent circuit. At frequencies above the fundamental frequency the attenuation introduced by the filter element 24 has some positive value. If the slots 24.31 to 24.33 and 24.41 to 24.43 were not present, a higher frequency range would be reached at which the attenuation of the filter would diminish or fall off rapidly with respect to frequency, as is illustrated by the dotted line 34. This is due to the fact that if the slots were not present, the aperture in each median region 24.3 or 24.4 would be a rectangular waveguide section able to propagate energy of some higher order mode of the fundamental frequency, *fo*. We have found that our novel filter structure extends to a higher frequency range the frequency region in which this tends to occur, and that the upper frequency limit of such higher frequency range occurs when the slot widths become approximately equal to the guide wavelength of the energy presented to the filter. By appropriate choice of slot widths, we can substantially extend the frequency range in which the filter element 24 has high attenuation values.

At frequencies below the fundamental frequency, *fo*, the attenuation has positive values, but this is not important because frequencies below *fo* are not propagated. Accordingly, for all practical purposes, the filter element 24, while it has the inherent characteristics of a band-pass filter, is the full equivalent of a low-pass filter when constructed and used as described above.

Figure 4:
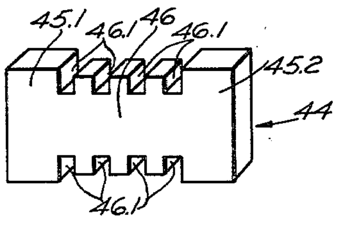
FIG. 4 is an isometric view of an alternative filter element.

FIG. 4 illustrates an alternative filter element 44 having end portions 45.1 and 45.2 which function as inductive iris elements in a rectangular waveguide operated in the fundamental or $TE_{10}$ mode, and an intermediate portion 46 which functions as a shunt capacitive element. The shunt capacitive portion 46 has four slots 46.1 on each side. We have found that by adjusting the widths, in the direction of the wide dimension of the X-band waveguide 21, of the end portions of the filter element, and the width in the same direction of the intermediate portion, we can adjust the inductance and capacitance of the fundamental tuned circuit, and can thereby control the effective "Q" thereof for the fundamental frequency, *fo*, or the dominant mode (where "Q" is defined as bandwidth at the half-power points of the tuned circuit), while simultaneously achieving a range of slot widths which is satisfactory for the purpose of extending the frequency range in which the filter element has acceptable high attenuation values.

In FIG. 7, which is a longitudinal section taken along line 7—7 in FIG. 2, the X-band and K-band waveguides 21 and 22 respectively, and the filter element 24 are shown in section, together with a nonlinear element 51 and a mount assembly, generally indicated by the reference character 50. The nonlinear element shown is one form of voltage-variable-capacitance diode having two electrical contacts 51.1 and 51.2, respectively. The mount assembly is mounted on the top wide wall 21.2 of the X-band wide wall (in the location defined by the circle 25 on line B—B in FIG. 2). This assembly comprises an outer tubular support 52, preferably made of metal and affixed as by soldering to the upper wide wall 21.2 in register with a hole 25.1 through this wall, corresponding to the circle 25 in FIG. 2. An electrically conductive inner sleeve 53 telescopically fitting in the outer tubular support holds an electrically conductive post 54 which fits telescopically within the sleeve. The post 54 and sleeve 53 are locked in any desired relative position within the outer support 52 by means of two set screws 55. The inner end of the post 54 is axially bored and radially slotted to provide spring fingers 56, in which one contact 51.1 of the diode 51 is held and to which this contact is electrically connected. A contact extender 58 in the form of an electrically conductive ring having spring fingers 59 is mounted on the remaining diode contact 51.2 in electrical connection therewith.

Embodiments of harmonic generators according to FIG. 7 have been built having the following characteristics:

| Input | | | Output | | |
|---|---|---|---|---|---|
| Frequency (*fo*) KMC/sec. | Band | Milli-watts | Frequency (*nfo*) KMC/sec. | Band | Conversion Loss (max.) |
| 9. 0±100 MC | X | 500 | 27. 0±300 MC | Ka | 20 db |
| 10. 0±100 MC | X | 500 | 30. 0±300 MC | Ka | 20 db |
| 11. 0±100 MC | X | 500 | 33. 0±300 MC | Ka | 20 db |

These embodiments may use Microwave Associates, Inc. type MA4253X "Varactor" voltage-variable-capacitance diodes, selected to have a zero-bias capacitance in the range from approximately 0.4 to 0.9 mmf., and a cutoff frequency of approximately 120 kmc./sec.

In the embodiment of FIG. 8 there are two mount assemblies 61 and 62 mounted, respectively, on the outer surfaces of the bottom and top wide walls 21.1 and 21.2 of the X-band waveguide 21, and holding a nonlinear element in the form of a voltage-variable-capacitance diode 63. The diode 63 is a type which has two contact pins 63.1 and 63.2. The lower mount assembly comprises a lower support member 61.1 of tubular form and having an outer end of reduced inner diameter in which a post 61.2 fits telescopically and can be locked in position by a set screw 61.3; the lower support member 61.1 is mounted on the bottom wide wall 21.1 in register with a hole 25.11 therethrough. In like fashion, the upper mount assembly comprises a similar upper tubular support member 62.1 mounted on the top wide wall 21.2 in register with a hole 25.12 therethrough, and supporting in its outer end of reduced inner diameter a post 62.2 which fits telescopically therethrough and can be locked in position by a set screw 62.3. The lower post 61.2 is axially bored and radially slotted at its inner end to provide spring fingers 61.21 which hold one contact pin 63.1 of the diode 63, and the upper post 62.2 is similarly provided with spring fingers 62.21 which hold the other contact 63.2 of the diode. The mount assemblies are made entirely of electrically conductive material and the spring fingers are electrically connected to the respective diode pins.

Embodiments of harmonic generators according to FIG. 8. have been built having the following characteristics:

| Input | | | Output | | |
|---|---|---|---|---|---|
| (*fo*) KMC/sec. | Band | Milli-watts | (*nfo*) KMC/sec. | Band | Conversion Loss (max.) |
| 9. 0±150 MC | X | 500 | 18. 0±300 MC | K | 17 db |
| 10. 0±150 MC | X | 500 | 20. 0±300 MC | K | 17 db |
| 11. 0±150 MC | X | 500 | 22. 0±300 MC | K | 17 db |
| 12. 0±150 MC | X | 500 | 24. 0±300 MC | K | 17 db |

Embodiments of the invention according to FIG. 8 may use Microwave Associates, Inc., type MA450D "Varactor" voltage-variable-capacitance diodes, selected to have a zero-bias capacitance in the range from approximately 0.75 to 1.1 mmf., and a cut-off frequency of approximately 60 kmc./sec.

Figure 9:
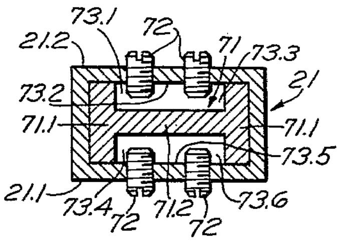
FIG. 9 is a vertical section in a plane similar to that of FIG. 3, showing another embodiment of the filter element of the invention.

In FIG. 9 a filter element 71 comprises a metal plate transversely fitted in the X-band waveguide 21, and comprising end portions 71.1 constituting inductive iris elements connected by an intermediate portion 71.2 constituting a capacitive element. Screw-threaded posts 72 are mounted in pairs in the wide walls 21.1 and 21.2 of the waveguide, and correspond electrically to the projections 24.35, 24.36 and 24.45, 24.46 of FIG. 3. The spaces 73.1–73.6 between these posts and confronting edges of the inductive elements 71 correspond to the slots 24.31 to 24.33 and 24.41 to 24.43, in FIG. 3. The posts 72 are adjustable in length thereby facilitating tuning the filter to a desired center frequency. In this embodiment, as in FIG. 3 or FIG. 4, the Q factor can be controlled as well as the upper frequency limit of the high attenuation range of the filter. The embodiment of FIG. 9 is thus both frequency tunable and adjustable as to its pass band.

Figure 10:
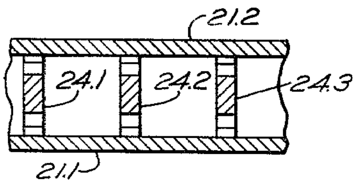
FIG. 10 is a longitudinal partial section in the same plane as FIG. 7, showing use of multiple filter elements to provide a broad-band filter section.

Filter elements according to the invention can be used in multiple, to provide broad banding as is illustrated, for example, in FIG. 10. This figure shows three filter elements 24.1, 24.2 and 24.3, like the element 24 in FIG. 7, located within the X-band waveguide 21. These elements are thus three parallel resonance circuits tuned for resonance at a given frequency (e.g., the fundamental frequency, *fo*) connected in parallel across the same transmission line. They are preferably spaced one-quarter guide wavelength apart for the same frequency. This yields a physically short broad-band filter, which can be designed to have many desirable features. For example, extremely sharp cut-off can be achieved by adjusting the relative Q factors of the respective filter elements to provide a Tschebyscheff or a Butterworth array of filter elements. Thus the relative Q factor values may be 0.5–1–0.5 for the filter elements 24.1, 24.2 and 24.3, respectively. Other known arrangements for achieving an electrically equivalent filter array involve the use of half-wave cavities, and result in a filter array which is twice as long, electrically, as the array shown in FIG. 10.

Those skilled in the art will recognize that filter elements according to this invention have uses in addition to their use in harmonic generators as herein illustrated and described. For example, a TR cell is effectively a filter section in the unfired condition, and it will be appreciated that filters and filter sections according to any one of FIGS. 3, 4, 9 and 10 can be used in TR cells, if desired.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. Microwave frequency harmonic generator for generating a harmonic frequency of a given fundamental frequency, comprising a transmission line section, a nonlinear element connected in circuit with said section at a first point intermediate its ends, a first frequency filter coupled in circuit with said section at a second point between said first point and a first end of said section, a second frequency filter coupled in circuit with said section at a third point between said first point and the second end of said section, said first filter being adapted to pass a band including said fundamental frequency and to reflect substantially completely energy at other frequencies including said harmonic frequency, said second filter being adapted to pass a band including said harmonic frequency and to reflect substantially completely energy at other frequencies including said fundamental frequency, the electrical distance between said first and second points being effectively a quarter wavelength in said section relative to said harmonic frequency, and the electrical distance between said first and third points being effectively a quarter wavelength in said section relative to said fundamental frequency.

2. Microwave frequency harmonic generator for generating a harmonic frequency of a given fundamental frequency, comprising a transmission line section, a nonlinear element connected across said section at a first point intermediate its ends, a first frequency filter coupled across said section at a second point between said first point and a first end of said section, a second frequency filter coupled across said section at a third point between said first point and the second end of said section, said first filter being adapted to pass a band including said fundamental frequency and to reflect substantially completely energy at other frequencies including said harmonic frequency, said second filter being adapted to pass a band including said harmonic frequency and to reflect substantially completely energy at other frequencies including said fundamental frequency, the electrical distance between said first and second points being effectively a quarter wavelength in said section relative to said harmonic frequency, and the electrical distance between said first and third point being effectively a quarter wavelength in said section relative to said fundamental frequency.

3. Microwave frequency harmonic generator for generating a harmonic frequency of a given fundamental frequency, comprising a section of rectangular waveguide having a cut-off frequency in the fundamental mode which is below said fundamental frequency, a nonlinear element coupled across said waveguide section at a first point intermediate its ends, a first frequency filter coupled across said waveguide section at a second point between said first point and a first end of said section, a second frequency filter coupled across said waveguide section at a third point between said first point and the second end of said section, said first filter being adapted to pass a band including said fundamental frequency and to reflect substantially completely energy at other frequencies including said harmonic frequency, said second filter being adapted to pass a band including said harmonic frequency and to reflect substantially completely energy at other frequencies including said fundamental frequency, the electrical distance between said first and second points being effectively a quarter wavelength in said waveguide relative to said harmonic frequency, and the electrical distance between said first and third points being effectively a quarter wavelength in said waveguide relative to said fundamental frequency.

4. Microwave frequency harmonic generator for generating a harmonic frequency of a given fundamental frequency, comprising a section of rectangular waveguide having a cut-off frequency in the fundamental mode which is below said fundamental frequency, a nonlinear element coupled across said waveguide section at a first point intermediate its ends, a first frequency filter coupled across said waveguide section at a second point between said first point and a first end of said section, a second frequency filter coupled across said waveguide section at a third point between said first point and the second end of said section, said first filter being adapted to pass said fundamental frequency and to reflect substantially completely energy at said harmonic frequency, said first filter comprising a flat rectangular electrically conductive element having the same length and width as the inner transverse dimensions of the wide and narrow walls, respectively, of said waveguide, the median portion of at least one long edge of said element being recessed relative to the end portions thereof and thereby spaced from the median portion of the confronting inner wide wall of said waveguide, a plurality of electrically conductive laterally spaced apart projections extending part-way across the region bounded by said median portions from one of said portions toward but not touching the other, the width of each of the lateral spaces in the direction parallel to said long edge being small compared to the wavelength in said waveguide of energy at said harmonic frequency, said second filter adapted to pass said harmonic frequency and to reflect substantially completely energy at said fundamental frequency, the electrical distance between said first and second points being effectively a quarter wavelength in said waveguide relative to said harmonic frequency, and the electrical distance between said first and third points being effectively a quarter wavelength in said waveguide relative to said fundamental frequency.

5. Microwave frequency harmonic generator for generating a harmonic frequency of a given fundamental frequency, comprising a section of rectangular waveguide having a cut-off frequency in the fundamental mode which is below said fundamental frequency, a non-linear element coupled across said waveguide section at a first point intermediate its ends, a first frequency filter coupled across said waveguide section at a second point between said first point and a first end of said section, a second frequency filter coupled across said waveguide section at a third point between said first point and the second end of said section, said first filter being adapted to pass said fundamental frequency and to reflect substantially completely energy at said harmonic frequency, said first filter comprising a flat rectangular electrically conductive element having the same length and width as the inner transverse dimensions of the wide and narrow walls respectively, of said waveguide, the median portion of at least one long edge of said element being recessed relative to the end portions thereof and thereby spaced from the median portion of the confronting inner wide wall of said waveguide, the recessed portion being notched in the direction normal to said confronting wide wall from the periphery of said median portion of said edge toward the longer median line of said element to provide a plurality of projections extending from the body of said element toward said confronting wide wall, the width of each notch in the direction parallel to said long edge being small compared to the wavelength in said waveguide of energy at said harmonic frequency, said second filter being adapted to pass said harmonic frequency and to reflect substantially completely energy at said fundamental frequency, the electrical distance between said first and second points being effectively a quater wavelength in said waveguide relative to said harmonic frequency, and the electrical distance between said first and third points being effectively a quarter wavelength in said waveguide relative to said fundamental frequency.

6. Harmonic generator according to claim 4 in which said electrically conductive projections comprise metallic posts extending through said median portion of said wide wall, said posts being longitudinally adjustable whereby said first filter is tunable.

7. Microwave frequency harmonic generator for generating a harmonic frequency of a given fundamental frequency, comprising a first section of first rectangular waveguide having a cut-off frequency in the fundamental mode which is below said fundamental frequency, a nonlinear element coupled across said first section at a first point intermediate its ends, a frequency filter coupled across said first section at a second point between said first point and a first end of said first section, said filter being adapted to pass a band including said fundamental frequency and to reflect substantially completely energy at other frequencies including said harmonic frequency, a second section of second rectangular waveguide having a cut-off frequency in the fundamental mode which is between said fundamental frequency and said harmonic frequency coupled at one end to said first section at a third point between said first point and the second end of said first section, the electrical distance between said first and second points being effectively a quarter wavelength in said first waveguide relative to said harmonic frequency, and the electrical distance between said first and third points being effectively a quarter wavelength in said first waveguide relative to said fundamental frequency.

8. Microwave frequency harmonic generator for generating a harmonic frequency of a given fundamental frequency, comprising a first section of first rectangular waveguide having a cut-off frequency in the fundamental mode which is below said fundamental frequency, a nonlinear element coupled across said first section at a first point intermediate its ends, a frequency filter coupled across said first section at a second point between said first point and a first end of said first section, said filter being adapted to pass said fundamental frequency and to reflect substantially completely energy at said harmonic frequency, said filter comprising a flat rectangular electrically conductive element having the same length and width as the inner transverse dimensions of the wide and narrow walls, respectively, of said first waveguide, the median portion of at least one long edge of said element being recessed relative to the end portions thereof and thereby spaced from the median portion of the confronting inner wide wall of said first waveguide, the recessed portion being notched in the direction normal to said confronting wide wall from the periphery of said median portion of said edge toward the longer median line of said element to provide a plurality of projections extending from the body of said element toward said confronting wide wall, the width of each notch in the direction parallel to said long edge being small compared to the wavelength in said first waveguide of energy at said harmonic frequency, and a second section of second rectangular waveguide having a cut-off frequency in the fundamental mode which is between said fundamental frequency and said harmonic frequency coupled at one end to said first section at a third point between said first point and the second end of said first section, the electrical distance between said first and second points being effectively a quarter wavelength in said first waveguide relative to said harmonic frequency, and the electrical distance between said first and third points being effectively a quarter wavelength in said first waveguide relative to said fundamental frequency.

9. Microwave frequency harmonic generator for generating a harmonic frequency of a given fundamental frequency, comprising a first section of first rectangular waveguide having a cut-off frequency in the fundamental mode which is below said fundamental frequency, a nonlinear element coupled across said first section at a first point intermediate its ends, a frequency filter coupled across said first section at a second point between said first point and a first end of said first section, said filter being adapted to pass said fundamental frequency and to reflect substantially completely energy at said harmonic frequency, said filter comprising a flat rectangular electrically conductive element having the same length and width as the inner transverse dimensions of the wide and narrow walls, respectively, of said first waveguide, the median portion of at least one long edge of said element being recessed relative to the end portions thereof and thereby spaced from the median portion of the confronting inner wide wall of the first waveguide, a plurality of electrically conductive laterally spaced apart projections extending part-way across the region bounded by said median portions from one of said portions toward but not touching the other, the width of each of the lateral spaces in the direction parallel to said long edge being small compared to the wavelength in said first waveguide of energy at said harmonic frequency, and a second section of second rectangular waveguide having a cut-off frequency in the fundamental mode which is between said fundamental frequency and said harmonic frequency coupled at one end to said first section at a third point between said first point and the second end of said first section, the electrical distance between said first and second points being effectively a quarter wavelength in said first waveguide relative to said harmonic frequency, and the electrical distance between said first and third points being effectively a quarter wavelength in said first waveguide relative to said fundamental frequency.

10. For use in a rectangular waveguide a frequency filter element adapted to pass microwave energy at a first frequency propagating in said waveguide in the fundamental mode and to reflect substantially completely microwave energy at a second frequency higher than said first frequency, comprising a flat rectangular electrically conductive element having the same length and width as the inner transverse dimensions of the wide and narrow walls, respectively, of said waveguide, the median portion of at least one long edge of said element being recessed a distance equal approximately to one-quarter said width relative to the end portions thereof, and thereby adapted to be spaced from the median portion of a confronting inner wide wall of said waveguide when said element is transversely mounted in said waveguide, a plurality of electrically conductive laterally spaced apart projections extending part-way across the region bounded by said median portions from one of said portions toward but not touching the other, the width of each of the lateral spaces in the direction parallel to the long edges being small compared to the wavelength in said waveguide of energy at said second frequency, said element being otherwise dimensioned completely to fill a cross-section of said waveguide.

11. For use in a rectangular waveguide, a frequency filter element adapted to pass microwave energy at a first frequency propagating in said waveguide in the fundamental mode and to reflect substantially completely microwave energy at a second frequency higher than said first frequency, comprising a flat rectangular electrically conductive element having the same length and width as the inner transverse dimensions of the wide and narrow walls, respectively, of said waveguide, the median portion of at least one long edge of said element being recessed a distance equal approximately to one-quarter said width relative to the end portions thereof, and thereby adapted to be spaced from the median portion of a confronting inner wide wall of said waveguide when said element is transversely mounted in said waveguide, the recessed portion being notched in the direction normal to said long edge from the periphery of said median portion toward the longer median line of said element to provide a plurality of projections extending from the body of said element toward said edge, the width of each notch in the direction parallel to the long edges being small compared to the wavelength in said waveguide of energy at said second frequency, said element being otherwise dimensioned completely to fill a cross-section of said waveguide.

12. Filter element according to claim 10 in which said electrically conductive projections comprise metallic posts extending through said median portion of said wide wall, said posts being longitudinally adjustable whereby said filter element is tunable.

13. For use in a rectangular waveguide, a frequency filter element adapted to pass microwave energy at a first frequency propagating in said waveguide in the fundamental mode and to reflect substantially completely microwave energy at a second frequency higher than said first frequency, comprising a flat rectangular electrically conductive element having the same length and width as the inner transverse dimensions of the wide and narrow walls, respectively, of said waveguide, the median portion of each long edge of said element being recessed a distance equal approximately to one-quarter said width relative to the end portions of said edge, and thereby adapted to be spaced from the median portion of a confronting inner wide wall of said waveguide when said element is transversely mounted in said waveguide, a plurality of electrically conductive laterally spaced apart projections extending part-way across each space in said waveguide bounded by one of said recessed portions and the median portion of the confronting wide wall of said waveguide, from one of said bounding portions toward but not touching the other, the width of each lateral space in the direction parallel to the long edges being small compared to the wavelength in said waveguide of energy at said second frequency, said element being otherwise dimensioned completely to fill a cross-section of said waveguide.

14. For use in a rectangular waveguide, a frequency filter element adapted to pass microwave energy at a first frequency propagating in said waveguide in the fundamental mode and to reflect substantially completely microwave energy at a second frequency higher than said first frequency, comprising a flat rectangular electrically conductive element having the same lentgh and width as the inner transverse dimensions of the wide and narrow walls respectively, of said waveguide, the median portion of each long edge of said element being recessed a distance equal approximately to one-quarter said width relative to the end portions of said edge, and thereby adapted to be spaced from the median portion of a confronting inner wide wall of said waveguide when said element is transversely mounted in said waveguide, each recessed portion being notched in the direction normal to said long edges from the outer periphery of said recessed portion toward the longer median line of said element to provide a plurality of projections extending from the body of said element toward each of said long edges, the width of each notch in the direction parallel to the long edges being small compared to the wavelength in said waveguide of energy at said second frequency, said element being otherwise dimensioned completely to fill a cross-section of said waveguide.

15. Filter element according to claim 13 in which the electrically conductive projections comprise a plurality of metallic posts extending through each wide wall of said waveguide toward the recessed median portion of said flat element, at least some of said posts being longitudinally adjustable whereby said filter element is tunable.

16. For use in a rectangular waveguide, a frequency filter element adapted to pass microwave energy at a first frequency propagating in said waveguide in the fundamental mode, and to reflect substantially completely microwave energy at a second frequency higher than said first frequency, comprising a flat rectangular metallic element dimensioned to fit within the transverse section of said waveguide in contact throughout its smaller edges with the confronting inner surfaces of the small walls of said waveguide, said element having the median portion of at least one of its larger edges recessed a distance equal approximately to one-quarter said width and having the end portions of each of its larger edges dimensioned to be in contact with the confronting inner surfaces of the wide walls of said waveguide, whereby the end portions of said element within each small edge and portions of the large edges contiguous thereto are adapted to constitute inductive iris means within said waveguide, the recessed portion of said one large edge being notched toward the longer median line of said element to provide projections on said element extending normal to said edge and terminating within the line connecting the end portions of said one edge, the intermediate portion of said element being adapted to constitute a capacitive iris element within said waveguide, the width of each notch in the direction of said one edge being small compared to the wavelength in said waveguide of energy at said second frequency.

17. For use in a rectangular waveguide, a frequency filter element adapted to pass microwave energy at a first frequency propagating in said waveguide in the fundamental mode, and to reflect substantially completely microwave energy at a second frequency higher than said first frequency, comprising a flat rectangular metallic element dimensioned to fit within the transverse section of said waveguide in contact throughout its smaller edges with the confronting inner surfaces of the small walls of said waveguide, said element having the median portion of at least one of its larger edges recessed a distance equal approximately to one-quarter said width and having the end portions of each of its larger edges dimensioned to be in contact with the confronting inner surfaces of the wide walls of said waveguide, whereby the end portions of said element within each small edge and portions of the large edges contiguous thereto are adapted to constitute inductive iris means within said waveguide, the recessed portion of said one large edge and the confronting median portion of a wide wall of said waveguide being adapted to comprise a capacitive element within said waveguide, laterally spaced apart electrically conductive projections extending part-way from one boundary of said capacitive element to the opposite boundary, the width of the lateral spaces in the direction of said one edge being small compared to the wavelength in said waveguide of energy at said second frequency.

18. For use in a rectangular waveguide, a frequency filter element adapted to pass microwave energy at a first frequency propagating in said waveguide in the fundamental mode and to reflect substantially completely microwave energy at a second frequency higher than said first frequency, comprising a flat rectangular metallic element dimensioned to fit within the transverse section of said waveguide in contact throughout its smaller edges with the confronting inner surfaces of the small walls of said waveguide, said element having the median portion of each of its larger edges recessed a distance equal approximately to one-quarter said width and having the end portions of said larger edges dimensioned to be in contact with the confronting inner surfaces of the wide walls of said waveguide, whereby the end portions of said element within each small edge and portions of the large edges contiguous thereto are adapted to constitute inductive iris means within said waveguide, the recessed portion of each large edge being notched toward the longer median line of said element to provide projections on said element extending normal to said long edges from the median portion of said element toward the recessed portion of each of said larger edges, the median portion of said element being adapted to constitute a capacitive iris element within said waveguide, the width of each notch in the direction of said longer median line being small compared to the wavelength in said waveguide of energy at said second frequency.

19. For use in a rectangular waveguide, a frequency filter element adapted to pass microwave energy at a first frequency propagating in said waveguide in the fundamental mode and to reflect substantially completely microwave energy at a second frequency higher than said first frequency, comprising a flat rectangular metallic element dimensioned to fit within the transverse section of said waveguide in contact throughout its smaller edges with the confronting inner surfaces of the small walls of said waveguide, said element having the median portion of each of its larger edges recessed a distance equal approximately to one-quarter said width and having the end portions of said larger edges dimensioned to be in contact with the confronting inner surfaces of the wide walls of said waveguide, whereby the end portions of said element within each small edge and portions of the large edges contiguous thereto are adapted to constitute inductive iris means within said waveguide, the recessed portion of each large edge and the confronting median portion of a wide wall of said waveguide being each adapted to comprise a capacitive element within said waveguide, laterally spaced apart electrically conductive projections extending part-way from one boundary of each of said capacitive elements to the opposite boundary, the width of each lateral space in the direction of said longer median line being small compared to the wavelength in said waveguide of energy at said second frequency.

References Cited by the Examiner

UNITED STATES PATENTS

| | | | |
|---|---|---|---|
| 2,366,981 | 1/45 | Paddle et al. | 321—69 |
| 2,787,766 | 4/57 | Scheftelowitz | 333—73 |
| 2,817,760 | 12/57 | Dobbertin | 321—69 |
| 2,858,513 | 10/58 | Lewin et al. | 333—73 |

FOREIGN PATENTS 1,194,850 5/59 France.

OTHER REFERENCES

"Solid State Microwave Electronics II," by Fortini and Vilms, published by Digest of Technical Papers (February 13, 1959), pages 82 and 83.

Microwave Filters Using Quarter-Wave Couplings: R. M. Fano and A. W. Lawson, Proceedings of the Institute of Radio Engineers, volume 35, No. 11, November 1947, pages 1318–1323.

LLOYD McCOLLUM, Primary Examiner.

IRVING L. SRAGOW, *Examiner.*